(12) United States Patent
Wang

(10) Patent No.: US 7,841,610 B2
(45) Date of Patent: Nov. 30, 2010

(54) FOLDABLE PEOPLE-CARRYING VEHICLE

(76) Inventor: Arthur Wang, No. 181, Dade 1st Rd., Gangshan Township, Kaohsiung County (TW)

( * ) Notice: Subject to any disclaimer, the term of this patent is extended or adjusted under 35 U.S.C. 154(b) by 227 days.

(21) Appl. No.: 12/213,218

(22) Filed: Jun. 17, 2008

(65) Prior Publication Data

US 2009/0308676 A1    Dec. 17, 2009

(51) Int. Cl.
  *B62K 15/00* (2006.01)
(52) U.S. Cl. ...................................... 280/208
(58) Field of Classification Search ............... 180/208
  See application file for complete search history.

(56) References Cited

U.S. PATENT DOCUMENTS 6,273,206 B1 * 8/2001 Bussinger .................. 180/208
2005/0173175 A1 * 8/2005 Lee ............................. 180/208
2007/0051548 A1 * 3/2007 Kosco et al. ................ 180/208
2009/0020350 A1 * 1/2009 Wu ............................. 180/208

\* cited by examiner

*Primary Examiner*—Eric Culbreth
*Assistant Examiner*—Karen Jane J Amores
(74) *Attorney, Agent, or Firm*—Rosenberg, Klein & Lee

(57) ABSTRACT

A vehicle includes a chassis body, a footrest member pivoted to a front end of the chassis body, a rear wheel assembly joined on the chassis body, a seat, a front wheel assembly in front of the footrest member, and a steering device; the seat is pivoted on an upper end of a supporting mechanism, which is pivoted on the chassis body, and can be moved between a raised in-use position and a lowered not-in-use one; the steering device includes a telescopic part, and is pivoted on a pivotal component protruding from an axle of the front wheel assembly to be movable between a raised in-use position and a lowered not-in-use one; an auxiliary wheel assembly is arranged in front of the footrest member and above the front wheel assembly so that the vehicle can be moved on the auxiliary wheel assembly when it is in a folded configuration.

3 Claims, 10 Drawing Sheets

FOLDABLE PEOPLE-CARRYING VEHICLE

BACKGROUND OF THE INVENTION

1. Field of the Invention

The present invention relates to a foldable people-carrying vehicle, more particularly one, which can be easily moved to a folded not-in-use configuration for easy storage and transportation, and can be moved around on its auxiliary wheel assembly like a wheeled suitcase after having been moved to the folded configuration.

2. Brief Description of the Prior Art

A person is prone to suffer from muscular dystrophy of the legs and physiological deterioration, and become unable to stand up or walk by himself/herself after he/she becomes very old, has injured lower limbs as the result of a traffic accident, has been bedridden for a long time or gets serious sickness such as paralysis of the lower half of the body. Consequently, such a person has to use a crutch to help him/her move. However, crutches can only help those people who still can walk by themselves, and the users still can't move rapidly or a long distance if they have the above-mentioned physical problems.

Therefore, the industry developed various people-carrying vehicles such as electric walk-substituting carts and electric wheel chairs for use by the elderly and physically disabled persons.

However, most of currently-existing people-carrying vehicles can't be reduced or folded to occupy less space for easy storage and transportation. Consequently, such people-carrying vehicles aren't convenient to use.

To overcome the above-mentioned problem, the industry developed a separable people-carrying vehicle, which can be easily separated into several different mechanisms by the users. However, it still will take a considerable amount of time and labor to separate the vehicle. Therefore, such a people-carrying vehicle isn't convenient to use, either.

Therefore, it is an object of the present invention to provide an easily foldable people-carrying vehicle to overcome the above problems.

SUMMARY OF THE INVENTION

A foldable people-carrying vehicle in accordance with an embodiment of the present invention includes a chassis body, a footrest member pivoted to a front end of the chassis body, a rear wheel assembly joined on the chassis body, a seat, a front wheel assembly in front of the footrest member, and a steering device. The seat is pivoted on an upper end of a supporting mechanism, which is pivoted on the chassis body, movable between a raised position and a lowered one. The steering device includes a telescopic part, and is pivoted to a pivotal component protruding from the front wheel assembly so as to be movable between a raised in-use position and a lowered not-in-use one. Furthermore, an auxiliary wheel assembly is arranged in front of the footrest member and above the front wheel assembly; thus, the vehicle can be moved on the auxiliary wheel assembly when it is in a folded configuration.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
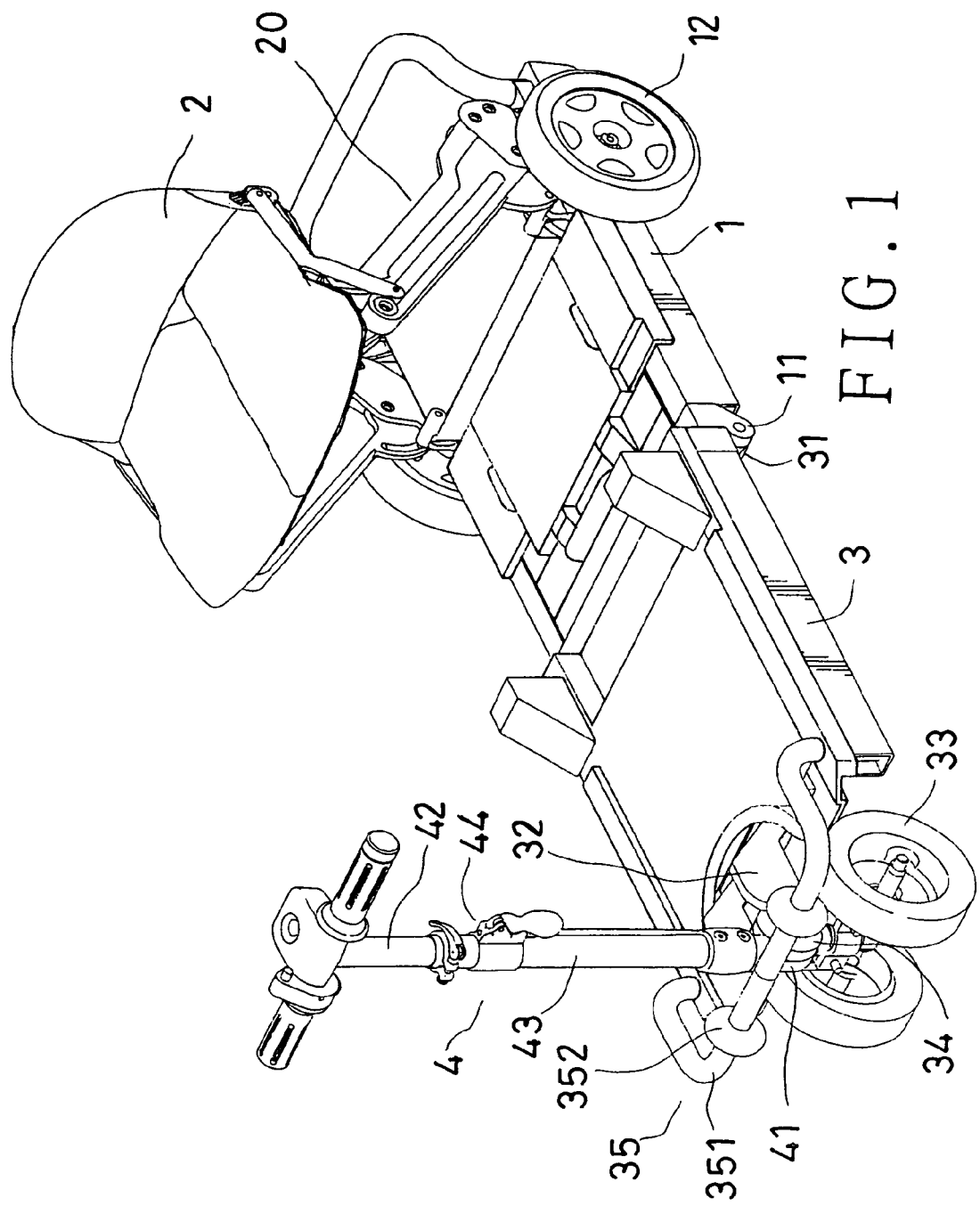
FIG. 1 is a perspective view of the present invention.
Figure 2:
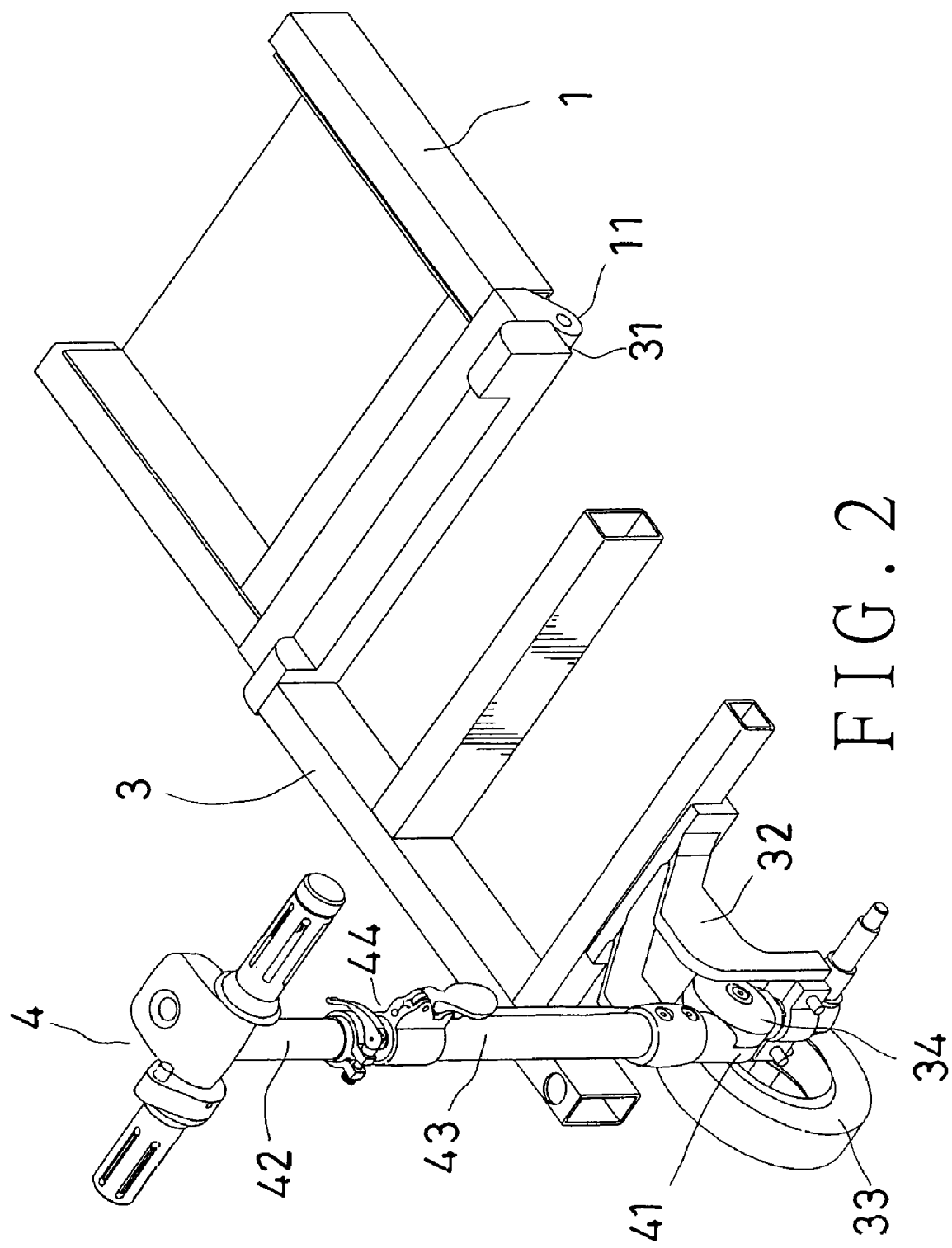
FIG. 2 is a perspective view of the present invention in a semi-assembled state.
Figure 3:
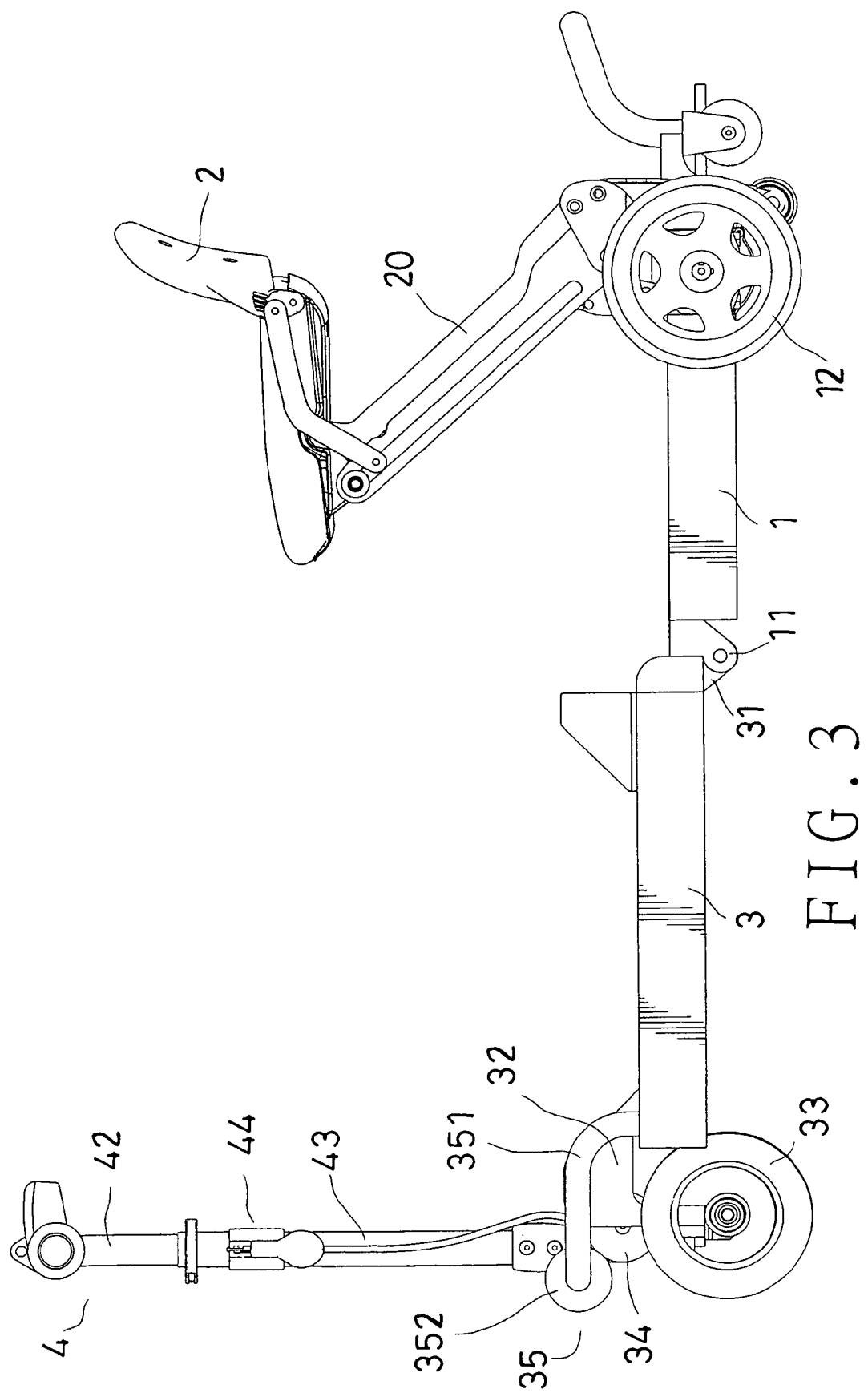
FIG. 3 is a side view of the present invention.

Referring to FIG. 1 to FIG. 3, a preferred embodiment of a foldable people-carrying vehicle of the present invention includes a chassis body 1, a seat 2, a footrest member 3, and a steering device 4.

The chassis body 1 has a pivotal part 11 on a front end thereof. A rear wheel assembly 12 is joined on a rear end of the chassis body 1.

The seat 2 is pivoted on a supporting mechanism 20, which is joined on an upper side of the chassis body 1, and can be moved between a raised in-use position and a lowered not-in-use position; the inventor of the present invention developed a folding and fixing structure of a seat of a people-carrying vehicle, and has filed a patent application based on the structure; such a structure allows the seat to be easily moved to and fixed in a stretched in-use position or a folded not-in-use one, yet it won't be further detailed hereinafter.

The footrest member 3 has a pivotal part 31, and it is pivoted to the front pivotal part 11 of the chassis body 1 at the pivotal part1 31 thereof. The footrest member 3 has a supporting part 32 extending from a front end thereof. A front wheel assembly 33 is joined on the supporting part 32 of the footrest member 3. The front wheel assembly 33 has an axle (not numbered), and a pivotal component 34 is joined on the axle so as to protrude from the front wheel assembly 33.

The steering device 4 has a pivotal part 41, and it is pivoted on the pivotal component 34 of the front wheel assembly 33 at the pivotal part 41 thereof. The steering device 4 includes a telescopic part, which consists of an outer tube part 43, an inner tube part 42 capable of sliding on an inner side of the outer tube part 43, and a fast-to-unfasten fixing device 44 installed on the outer tube part 43; the fast-to-unfasten fixing device 44 can be used to fix the inner tube part 42 to the outer tube part 43 after the inner tube part 42 is adjusted in position.

Furthermore, the foldable people-carrying vehicle includes an auxiliary wheel assembly 35, which is positioned in front of the footrest member 3 and above the front wheel assembly 33; the auxiliary wheel assembly 35 includes a supporting rod 351 joined on a front end of the footrest member 3, and two casters 352 supported on the supporting rod 351.

Figure 4:
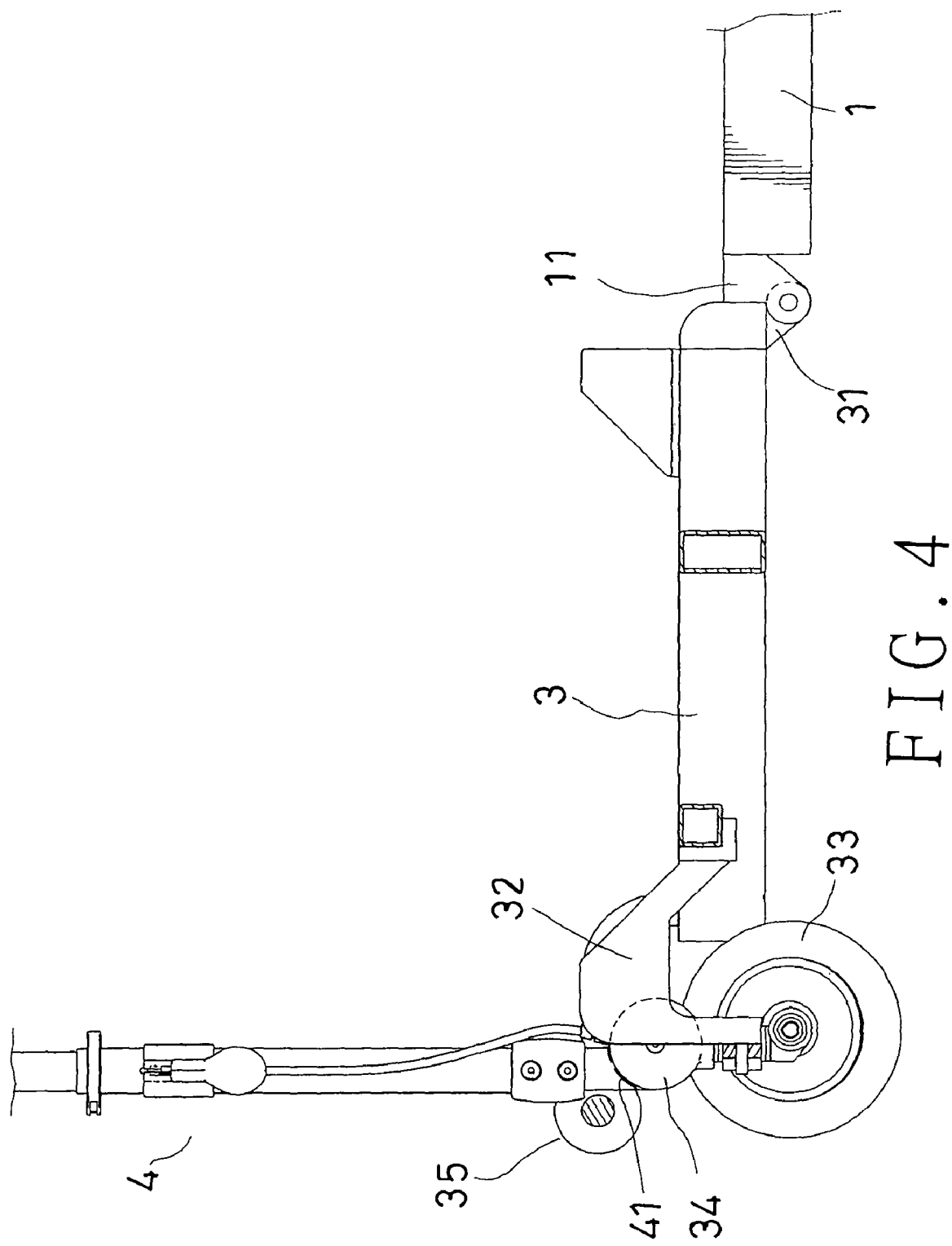
FIG. 4 is a partial side view of the present invention, taken during a lowering motion of the steering device (1)
Figure 5:
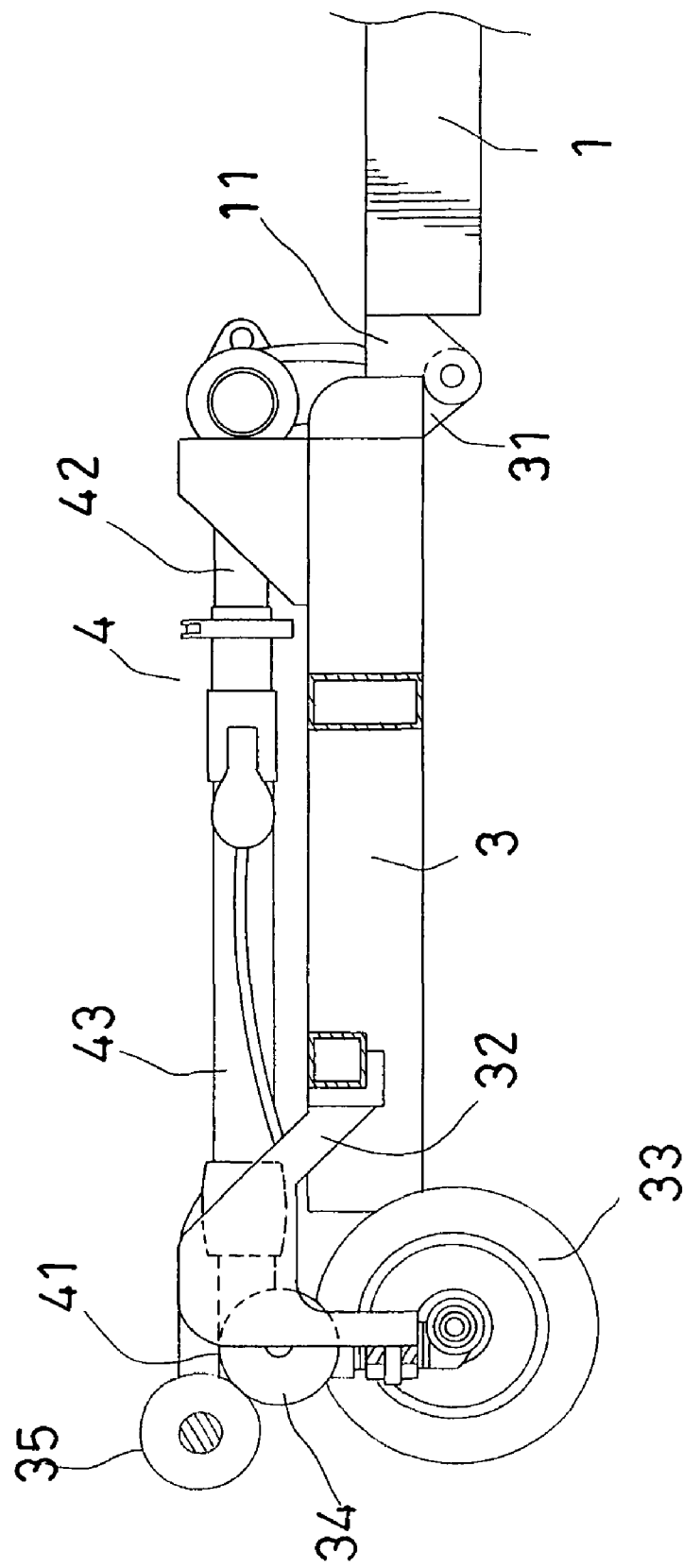
FIG. 5 is a partial side view of the present invention, taken during a lowering motion of the steering device (2)
Figure 6:
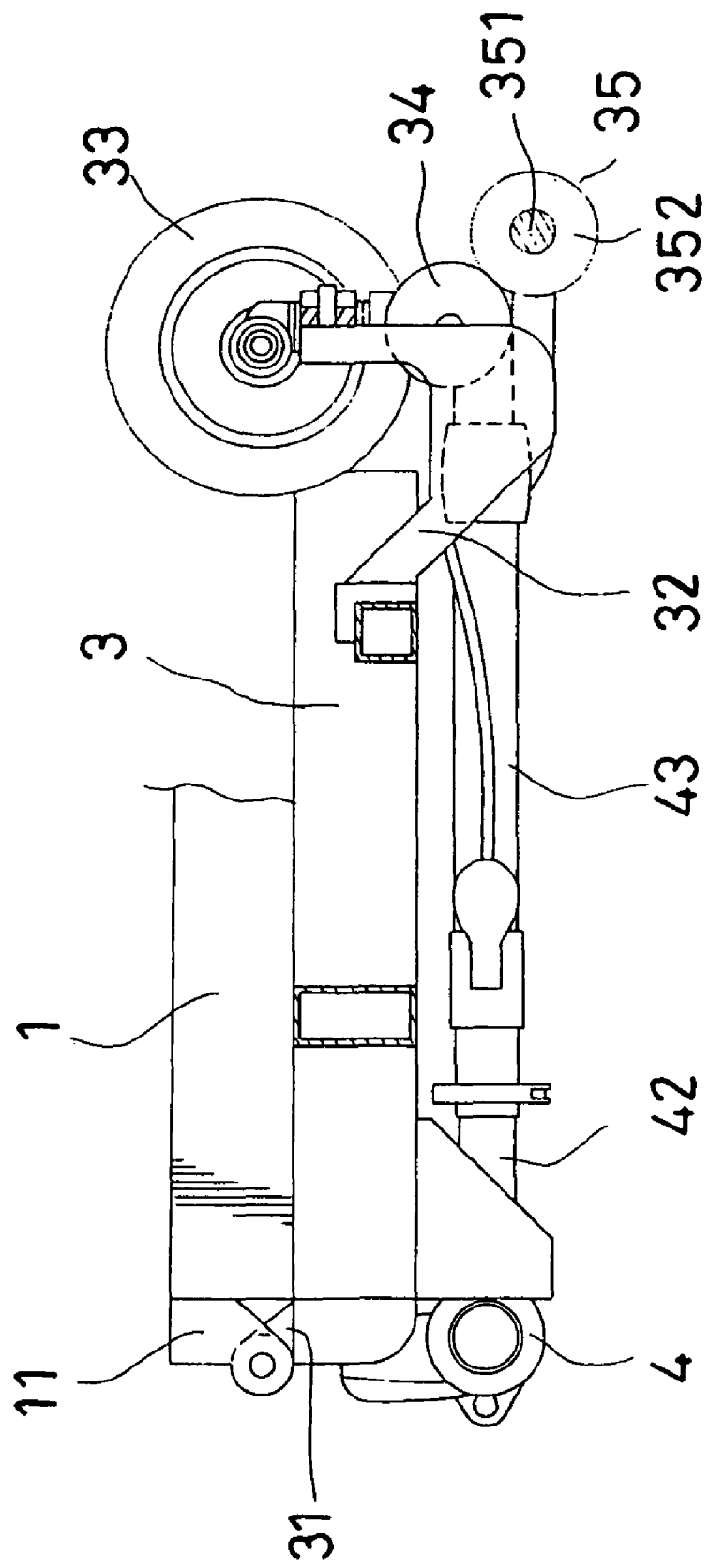
FIG. 6 is a partial side view of the present invention in a folded configuration.
Figure 7:
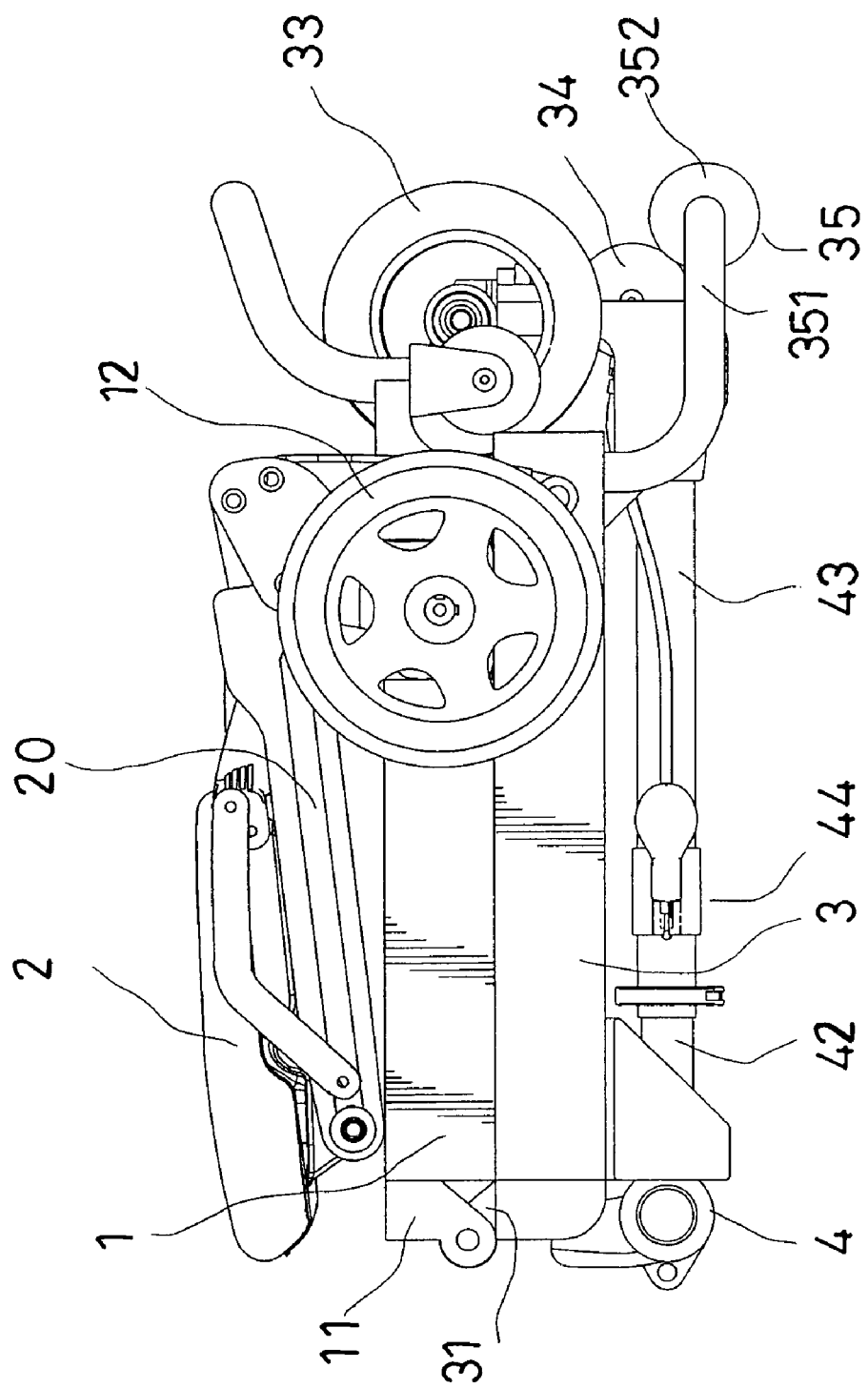
FIG. 7 is a side view of the invention in a folded configuration.
Figure 8:
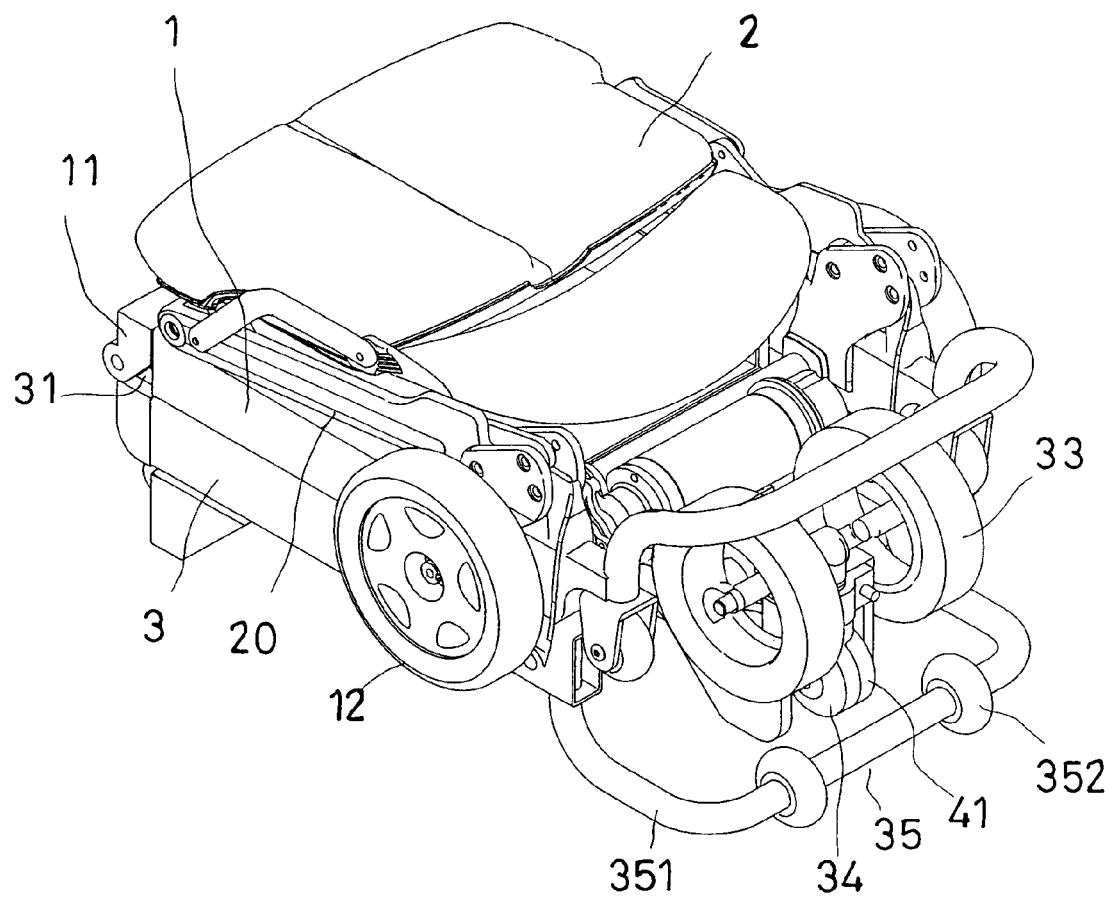
FIG. 8 is a perspective view of the present invention in a folded configuration.
Figure 9:
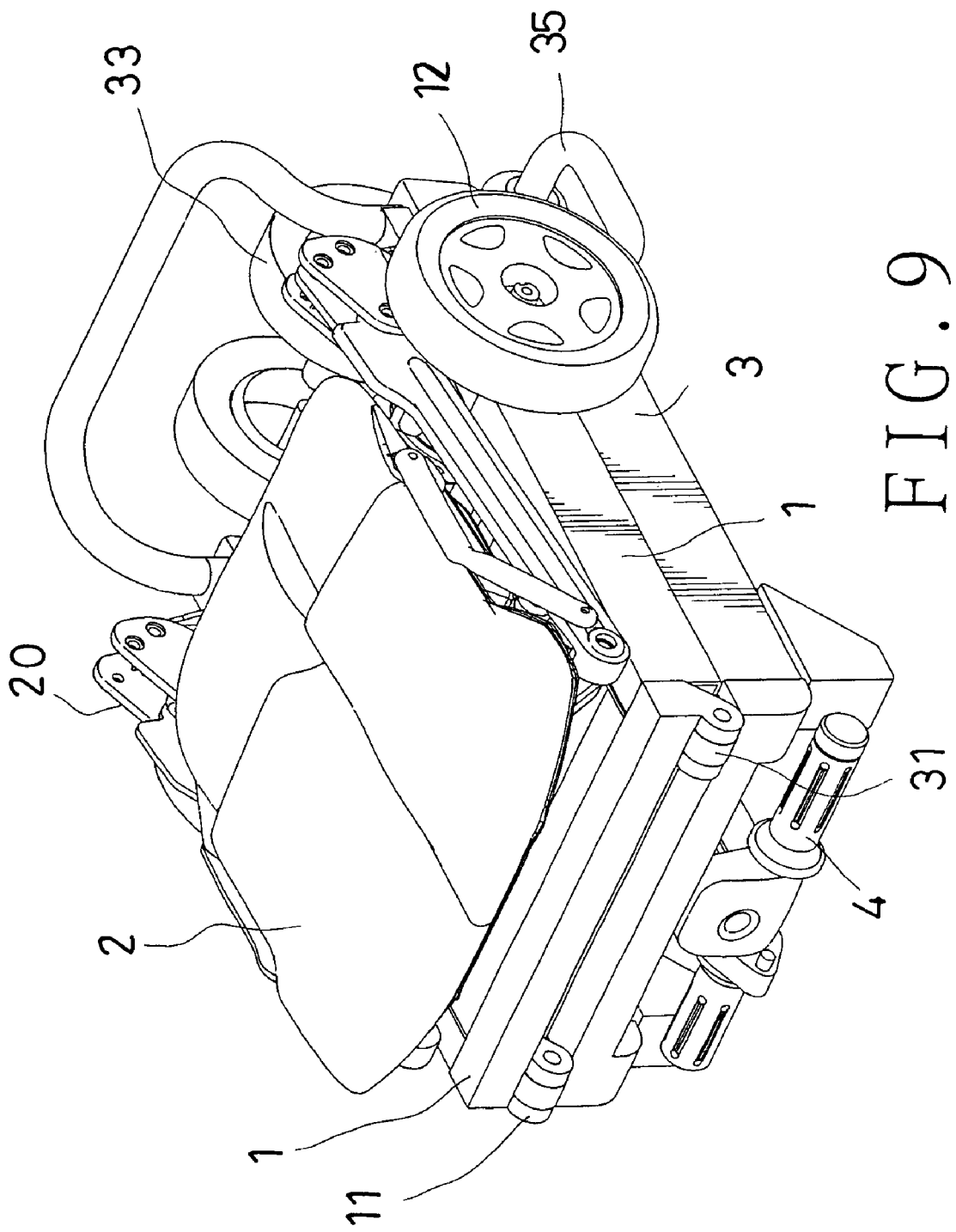
FIG. 9 is another perspective view of the present invention in a folded configuration.

Referring to FIGS. 4 and 5, to move the people-carrying vehicle to the folded not-in-use position, first the user should pivot the steering device 4 on the pivotal component 34 joined on the front wheel assembly 33 so that the steering device 4 is close to the upper side of the footrest member 3. Next, the user should pivot the supporting mechanism 20 downwards, and pivot the seat 2 on the supporting mechanism 20 so that the seat 2 is in the lowered not-in-use position, close to the upper side of the chassis body 1. Third, the footrest member 3 is pivoted on the pivotal part 11 of the chassis body 1 so as to be right under and close to the bottom of the chassis body 1, with the casters 352 of the auxiliary wheel assembly 35 sticking out beyond the front and the rear wheel assemblies 33 and 12, as shown in FIG. 6 to FIG. 9.

Figure 10:
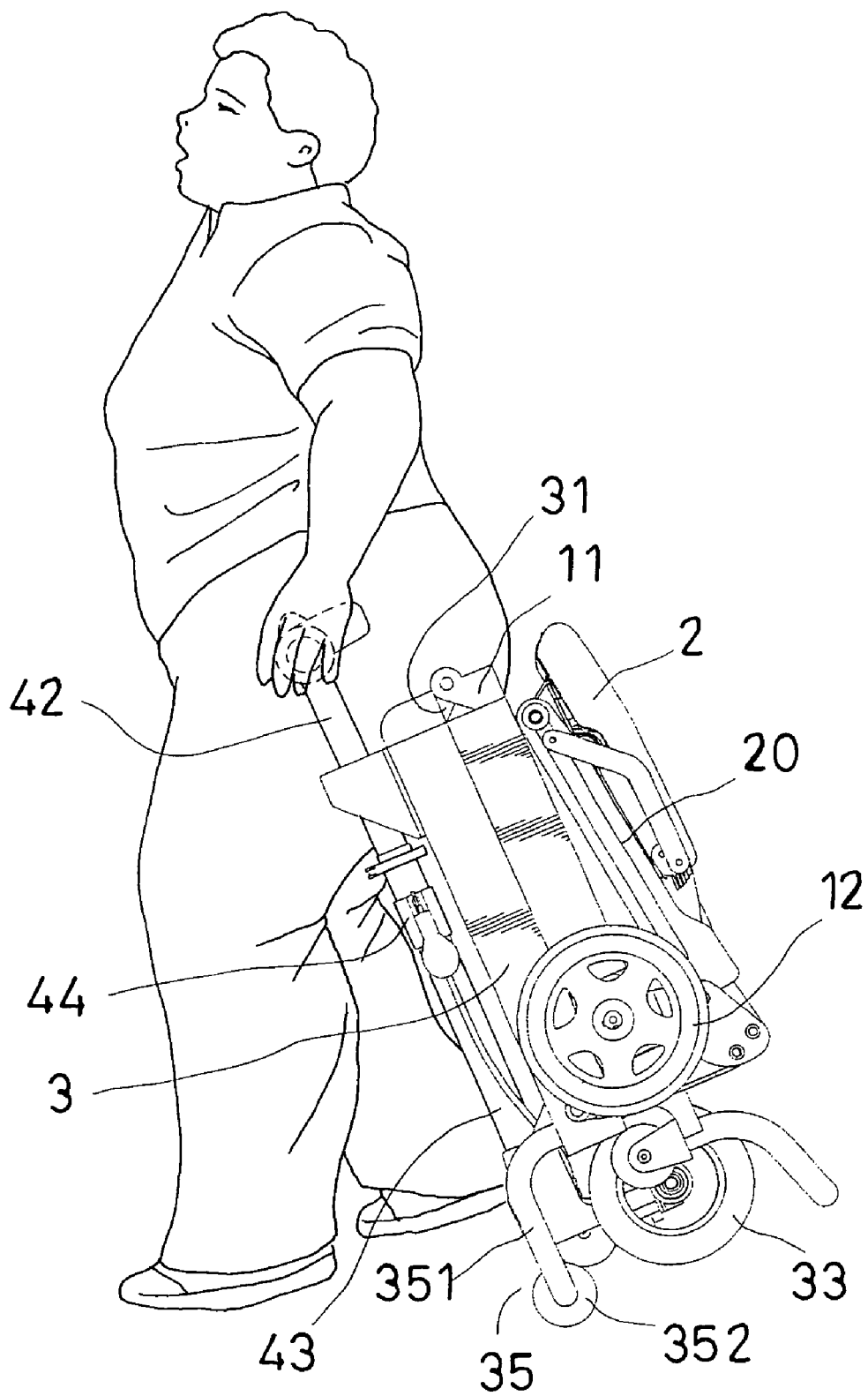
FIG. 10 is a view illustrating the use of the auxiliary wheel assembly of the present invention.

Therefore, the people-carrying vehicle in the folded not-in-use configuration can be easily moved around on the auxiliary wheel assembly 35 like a luggage trolley/wheeled suitcase, with the original upper part of the steering device 4 being used as a handle, as shown in FIG. 10. In addition, before the folded people-carrying vehicle is moved on the auxiliary wheel assembly 35, the steering device 4 can be adjusted in its length according to the height of the user.

From the above description, it can be seen that the people-carrying vehicle of the present invention has the following advantages over the prior art: the people-carrying vehicle of the present invention can be moved to and fixed in a folded configuration to have a relatively flat shape, thus occupying much less space for allowing easy storage and transportation; when the people-carrying vehicle is in the folded not-in-use configuration, it can be easily moved around on the auxiliary wheel assembly like a luggage trolley/wheeled suitcase, with the upper part of the steering device serving as a handle.

What is claimed is:

1. A foldable people-carrying vehicle, comprising:
    a chassis body having a first pivotal part on a front end thereof;
    a rear wheel assembly joined on a rear end of the chassis body;
    a supporting mechanism movable between a raised in-use position and a lowered not-in-use one on an upper side of the chassis body;
    a seat pivoted on the supporting mechanism;
    a footrest member having a second pivotal part, the footrest member and the chassis body being pivoted together by the first and second pivotal parts;
    a front wheel assembly being positioned in front of the footrest member, the front wheel assembly having a pivotal component protruding therefrom;
    a steering device having a third pivotal part, the steering device being pivoted on the pivotal component of the front wheel assembly by the third pivotal part; and
    an auxiliary wheel assembly positioned in front of the footrest member and above the front wheel assembly, the auxiliary wheel assembly including a supporting rod joined on a front end of the footrest member, and at least one caster being supported on the supporting rod.

2. A foldable people-carrying vehicle, comprising:
    a chassis body having a first pivotal part on a front end thereof;
    a rear wheel assembly joined on a rear end of the chassis body;
    a supporting mechanism movable between a raised in-use position and a lowered not-in-use one on an upper side of the chassis body;
    a seat pivoted on the supporting mechanism;
    a footrest member having a second pivotal part, the footrest member and the chassis body being pivoted together by the first and second pivotal parts, the footrest member having a supporting part extending from a front end thereof;
    a front wheel assembly being positioned in front of the footrest member, the front wheel assembly having a pivotal component protruding therefrom, the front wheel assembly being joined on the supporting part of the footrest member, the front wheel assembly having an axle, the pivotal component being joined on the axle of the front wheel assembly;
    a steering device having a third pivotal part, the steering device being pivoted on the pivotal component of the front wheel assembly by the third pivotal part; and
    an auxiliary wheel assembly positioned in front of the footrest member and above the front wheel assembly.

3. The foldable people-carrying vehicle as claimed in claim 1, wherein the steering device includes a telescopic part, which consists of an outer tube part, an inner tube part capable of sliding on an inner side of the outer tube part, and a fast-to-unfasten fixing device installed on the outer tube part; the fast-to-unfasten fixing device being used to fix the inner tube part to the outer tube part after the inner tube part is adjusted in position.

* * * * *